United States Patent
Rashid et al.

(10) Patent No.: US 7,805,627 B2
(45) Date of Patent: Sep. 28, 2010

(54) CLOCK SYNCHRONIZATION SCHEME FOR DESKEWING OPERATIONS IN A DATA INTERFACE

(75) Inventors: Mamun Ur Rashid, Folsom, CA (US); Hing Y. To, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 11/729,627

(22) Filed: Mar. 29, 2007

(65) Prior Publication Data

US 2008/0244298 A1 Oct. 2, 2008

(51) Int. Cl.
- G06F 1/04 (2006.01)
- G06F 1/12 (2006.01)
- G06F 1/14 (2006.01)

(52) U.S. Cl. ............... 713/400; 713/500; 713/501; 713/502; 713/503; 713/600; 327/233; 327/235; 327/237

(58) Field of Classification Search .......... 713/500, 713/501, 502, 503, 600, 400; 327/233, 235, 327/237

See application file for complete search history.

(56) References Cited

U.S. PATENT DOCUMENTS

| | | | |
|---|---|---|---|
| 6,928,631 B2 * | 8/2005 | Matsumoto | 716/6 |
| 7,028,206 B2 * | 4/2006 | Waller | 713/400 |
| 7,174,475 B2 * | 2/2007 | Lee et al. | 713/503 |
| 7,337,344 B2 * | 2/2008 | Barman et al. | 713/400 |
| 2003/0126489 A1 * | 7/2003 | Johansen et al. | 713/401 |
| 2007/0147563 A1 * | 6/2007 | Brunnert et al. | 375/354 |

* cited by examiner

Primary Examiner—Thomas Lee
Assistant Examiner—Michael J Brown
(74) Attorney, Agent, or Firm—Trop, Pruner & Hu, P.C.

(57) ABSTRACT

A technique includes providing transmitters that are each associated with a data bit line of a bus, and each transmitter is clocked by an associated transmit clock signal. The technique includes determining a baseline offset to apply to a base clock signal to synchronize the base clock signal to a source clock signal of a source that supplies data to the transmitters. For each transmitter, an associated phase offset is determined to compensate for an associated skew. The phase of each transmit clock signal is controlled based on the associated phase offset and the baseline offset.

10 Claims, 3 Drawing Sheets

CLOCK SYNCHRONIZATION SCHEME FOR DESKEWING OPERATIONS IN A DATA INTERFACE

BACKGROUND

The invention generally relates to a clock synchronization scheme for deskewing operations in a data interface, such an interface to a memory bus, for example.

A typical memory controller hub, or north bridge, of a computer system includes a memory interface, which establishes communication between the memory controller hub and the memory bus. The memory bus typically skews the data bit signals with respect to the clock signal. Therefore, the memory interface typically implements a scheme to adjust the timing between the data bit and clock signals to compensate for the skewing. In conventional de-skewing schemes, the timing may be adjusted on all of the outgoing data bit signals as a group by adjusting read pointers that point to the data bits in output buffers.

More specifically, a conventional memory interface of a memory controller hub may have a core partition, which furnishes the data that is to be written to the memory. An analog partition of the memory interface generates the clock and data signals that appear on the memory bus; and a high speed input/output (HSIO) partition contains first in first out (FIFO) circuits to handle the clock domain transfer between the core and analog partitions.

A conventional memory interface may delay the clock signal that is sent to the analog I/O partition for purposes of optimizing the channel timing, and after the I/O clock setting is fixed by channel requirements, the I/O partition clock signal triggers the read pointers for all of the FIFOs of the HSIO partition. The FIFOs must be deep enough to absorb the variation differences between the I/O clock tree and the clock signal provided by the core partition. The deeper the FIFO is, the larger the latency and the power dissipation will be. However, such a design may require the FIFOs to be too large to be incorporated into the analog I/O interface. Furthermore, conventional de-skewing schemes do not allow compensation for the individual data bit lines, as the timing is regulated for the data bit lines as a group.

Thus, there is a continuing need for better ways to implement de-skewing in a data, such as a memory interface.

DETAILED DESCRIPTION

Figure 1:
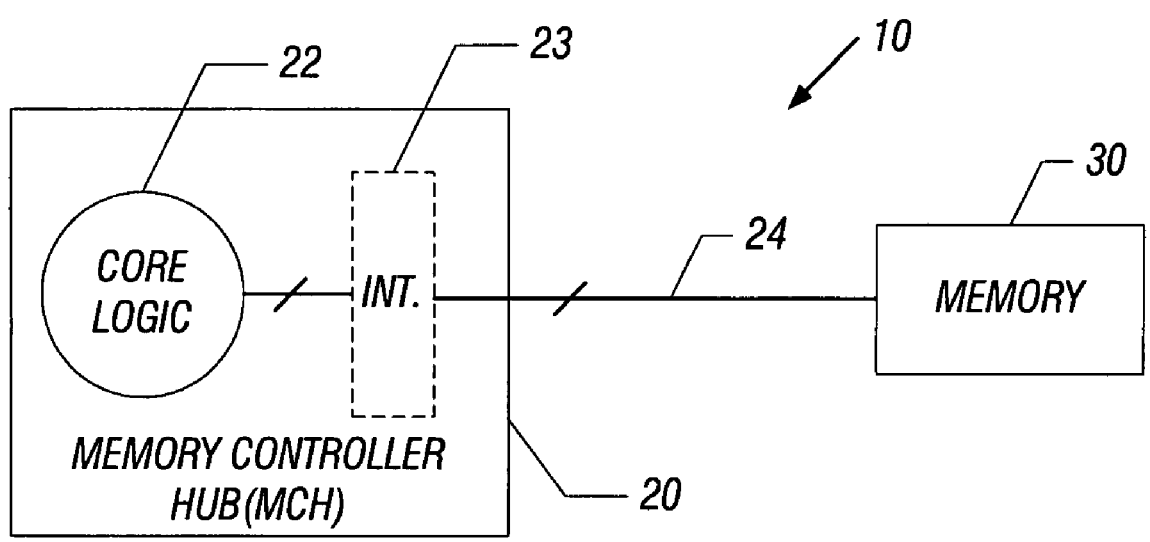
FIG. 1 is a schematic diagram of a memory subsystem according to an embodiment of the invention.

Referring to FIG. 1, an embodiment 10 of a memory subsystem in accordance with the invention includes a north bridge, or memory controller hub (MCH) 20, which generally serves as an interface for components of a computer system (not shown) for purposes of storing data in and retrieving data from a memory 30 (a dynamic random access memory (DRAM), for example). In this regard, the MCH 20 may communicate with the memory 30 via a memory bus 24. For this purpose, the MCH 20 may include core logic 22, which as its name implies, generates data to be transmitted to the memory 30 through a memory interface 23. As described herein, the memory interface 23 de-skews the data and clock signals that are provided to the memory bus 24 (i.e., time-shifts the data signals so that the data signals are appropriately aligned with the clock signals); and the memory interface 23 implements a clock synchronization scheme in connection with the de-skewing operations for purposes of improving the rate at which data is communicated through the memory interface 23. As also described herein, the memory interface 23 de-skews the data bit signals on an individual basis and at the same time globally adjusts the timing of the data bit signals to account for such global factors as voltage and temperature drift.

Figure 2:
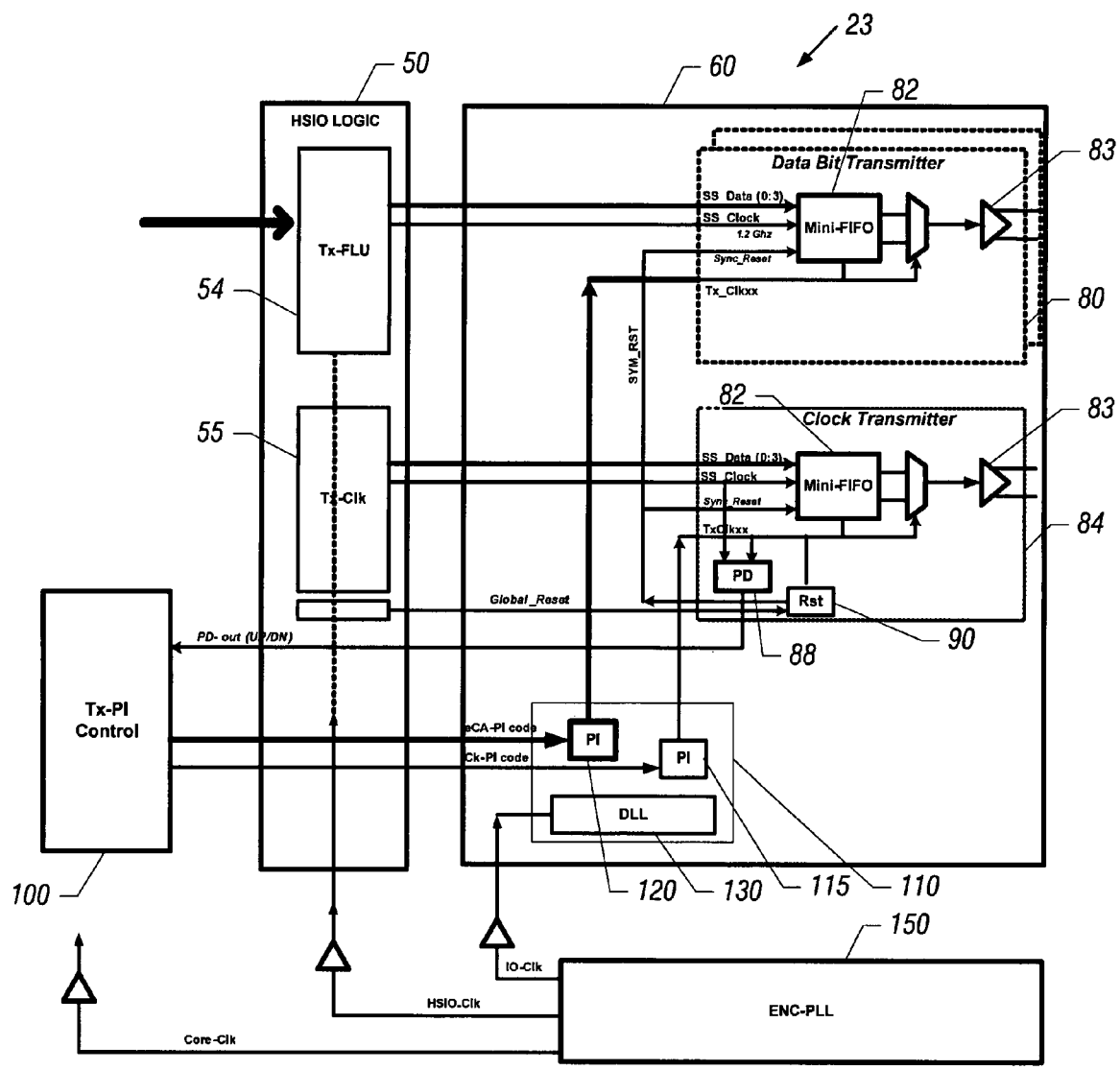
FIG. 2 is a schematic diagram of a memory interface of the memory subsystem of FIG. 1 according to an embodiment of the invention.

Referring to FIG. 2 in conjunction with FIG. 1, in accordance with some embodiments of the invention, the memory interface 23 includes high speed input/output (HSIO) logic 50 that includes one or more buffers 54 (first-in-first out (FIFO) buffers, for example) to receive incoming data from the core logic 22 (see FIG. 1), which is to be transmitted to the memory 30. The HSIO logic 50 may also include one or more buffers 55 (FIFO buffers, for example) to store an associated clock signal from core logic 22. In accordance with some embodiments of the invention, the HSIO logic 50 is clocked by a clock signal (called "HSIO_Clk"), which is source synchronous with the core logic 22. The HSIO logic 50 provides the stored clock and data signals to a module 60, which generates external data and clock signals on the pads that are connected to the traces of the memory bus 24. As described further below, the module 60 synchronizes the output pad clock signal (provided to the memory bus 24) and its internal clock signals to an output clock signal (called "SS_Clock") of the HSIO logic 50. In this manner, the HSIO logic 50 uses the SS_Clock clock signal to clock the outgoing data from the buffers 54 and 55, which is received by the module 60.

It is noted that although a single module 60 is depicted in FIG. 2, the memory interface 23 may include multiple modules 60 in accordance with some embodiments of the invention.

A set of source synchronous clocks is created, from the core logic 22, through the HSIO 50 and continuing to the components of the module 60, described further below. By using source synchronous clocks, the timing margin between the core logic 22 and the analog input/output (I/O) circuitry interface, such as the module 60, is significantly improved, as compared to conventional memory interfaces.

The module 60 contains data bit transmitters 80 (one exemplary data bit transmitter 80 being depicted in detail in FIG. 2), each of which is associated with a data bit line of the memory bus 24 and each of which receives an associated set of data bit signals (called "SS_Data [0:3]") from the HSIO logic 50. Each data bit transmitter 80 generates (via an output driver 83) its data bit signal on one of the external data bit pad terminals of the module 60, which is connected to a corresponding data bit line, or trace, of the memory bus 24. Each of the data bit transmitters 80 also receives the SS_Clock signal from the HSIO logic 50.

The module 60 also includes a clock transmitter 84, which has the same general design as the data bit transmitter 80, with like reference numerals being used to depict similar components. The clock transmitter 84 receives clock data (indicative of the clock signal to accompany the data on the memory bus 24) from the HSIO 50 as well as the SS_Clock signal. The clock transmitter 84 generates an outgoing clock signal (via the output driver 83) that appears on the external clock pad terminal, which is connected to a corresponding clock line of the memory bus 24.

In general, each transmitter 80, 84 has a relatively small FIFO 82 (a FIFO having a depth of two, for example), which stores the incoming data from the HSIO logic 50. As described below, clock signals that control the communication of data from the FIFOs 82 to the memory bus 24 are adjusted for purposes of de-skewing; synchronizing the module 60 to the HSIO logic 50 and core logic 22; and compensating for such global factors as temperature and voltage drift.

As described further below, the module 60 includes a locked loop circuit 110 that synchronizes clock signals for the module 60 with the SS_Clk signal (that clocks the HSIO logic 50). More specifically, the locked loop circuit 110 includes a delay locked loop (DLL) 130 that locks onto a baseline clock signal (called "IO_Clk") that is synchronized to the SS_Clk signal (by a phase locked loop (PLL) 150) for purposes of generating transmit clock signals (called "TxClkxx") that have programmable offsets, or phases. The TxClkxx transmit clock signals, in turn, are received by the data bit 80 and clock 84 transmitters and control the timing of the data retrieved from the FIFOs 82. At initialization of the memory interface 23, each of the TxClkxx signals are synchronized and have the same phase (all of the TxClkxx signals are identical to the IO_Clk signal, for example). Thus, all of the transmitters 80 and 84 may be started deterministically. However, as described below, phase offsets are determined for the TxClkxx signals for purposes of establishing individual data bit line de-skewing. Additionally, a baseline clock offset, which is applied to all of the TxClkxx signals that are provided to the data bit transmitters 80 for purposes of the source synchronization, is continually updated to globally compensate all of the TxClkxx signals for global factors, such as process variations and temperature and voltage drift.

For purposes of generating the TxClkxx signals, the locked loop circuit 110 includes phase interpolators 115 and 120. The phase interpolator 115 generates the TxClkxx signal for the clock transmitter 84 based on a code (called a "baseline code" herein) that is received from a controller 100; and the phase interpolators 120 (one exemplary interpolator 120 being depicted in FIG. 2) generates the TxClkxx signals (which may each be different) for the data bit transmitters 80, based on codes that are received from the controller 100. Thus, each phase interpolator 120 is associated with one of the data bit transmitters 80 and generates a TxClkxx signal for the associated data bit transmitter 80 based on the received code from the controller 100. The DLL 130 of the locked loop circuit 110 generates a baseline clock signal that is synchronized to the IO_Clk signal, and the phase interpolator 115 shifts the phase of this signal by the amount indicated in the baseline code to generate the TxClkxx signal for the clock transmitter 84. Likewise, each phase interpolator 120 shifts the phases of the signal generated by the DLL 130 according to its received code to generate the TxClkxx signal for its associated data bit transmitter 80.

The controller 100 generates the baseline code for the phase interpolator 115 based on a signal that is provided by a phase detector 88 of the clock transmitter 84. In this regard, the phase detector 88 compares the phases of the SS_Clock signal and its associated TxClkxx signal and generates a signal (called "PD_out (UP/DN)") that indicates the result of the comparison so that the controller 100 may generate the appropriate baseline codes to maintain synchronization between these clock signals. The controller 100 generates the code for each data bit transmitters 80 based on the baseline code and on the individually-determined de-skew adjustment for that transmitter 80.

Figure 3:
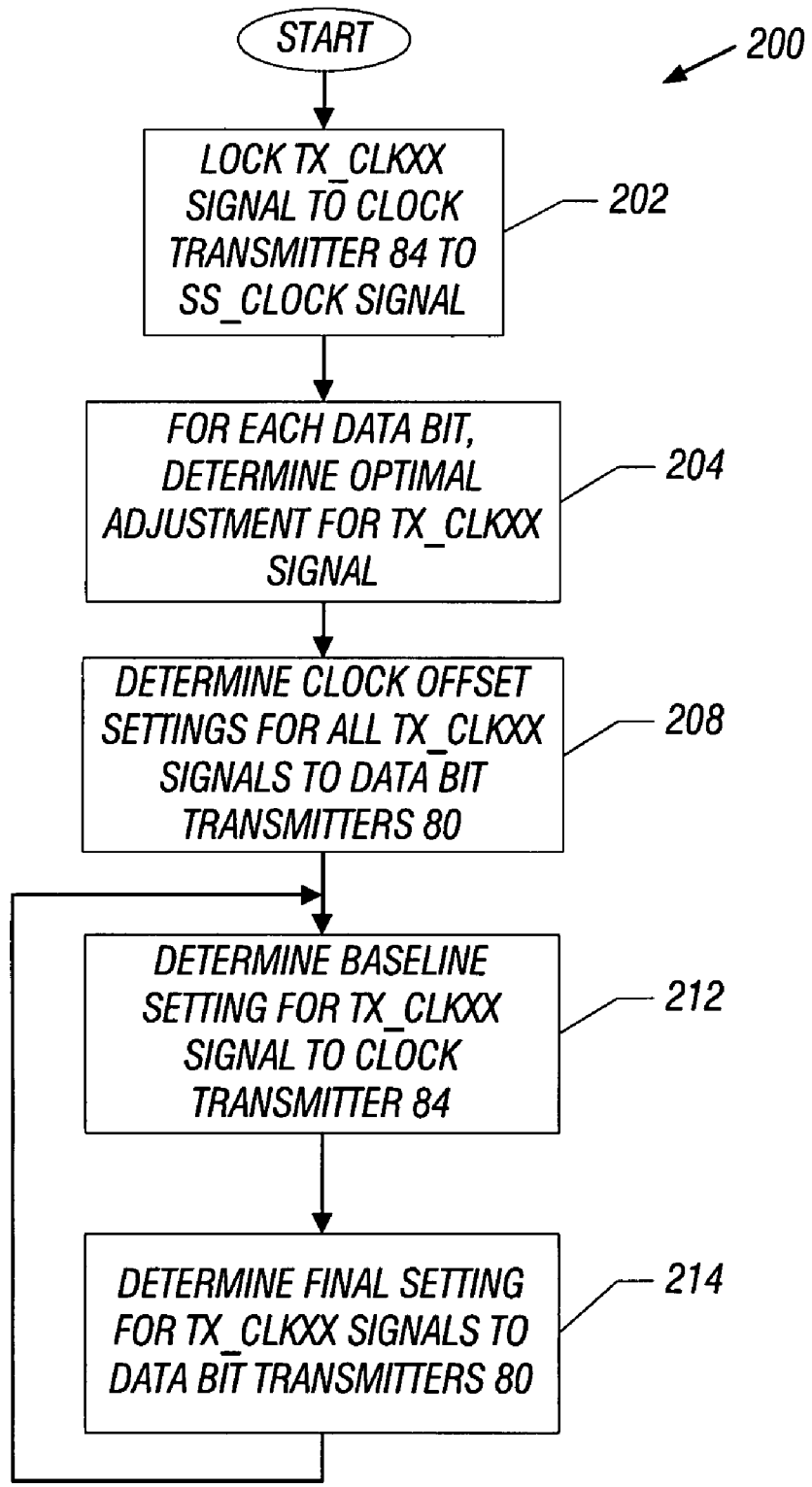
FIG. 3 is a flow diagram depicting a clock de-skewing technique according to an embodiment of the invention.

FIG. 3 generally depicts a technique 200 for generating the codes (which are used to generate the TxClkxx transmit clock signals) in accordance with some embodiments of the invention. Referring to FIG. 3 in conjunction with FIGS. 1 and 2, pursuant to the technique 200, the TxClkxx signal that is provided to the clock transmitter 84 is first locked to the SS_Clock signal, thereby making the module 60 source synchronous to the HSIO logic 50, pursuant to block 202. To accomplish this, the controller 100 determines a baseline code, which indicates a baseline phase for the purpose of source synchronization. The controller 100 may continually update the baseline code based on the PD_out (UP/DN) signal that is provided by the phase detector 88. This baseline phase is ultimately used as a component in the phase offset for each TxClkxx signal, with each TxClkxx signal for the data bit transmitters 80 being additionally adjusted to compensate for skew. For purposes of setting forth an example, assume the baseline code at this point is 40 hex.

Next, pursuant to the technique 200, for each data bit transmitter 80, an optimal setting for the associated TxClkxx signal is determined, pursuant to block 204. In this regard, the controller 100 determines the offset that establishes an appropriate timing at the external pads between the associated data bit signal and the clock signal. This offset may be determined via channel training or may be predetermined from the physical characteristics of the memory interface 23. Continuing the example above, for data bit zero (as an example), the controller 100 may determine that the setting for the corresponding TxClkxx signal is 43 hex. For each data bit transmitter 80, the controller 100 determines (block 208) an offset code, which indicates the offset from the baseline phase. For the example of a baseline code of 40 hex and a code of 43 hex for data bit zero, the offset code is therefore +3 hex.

After the offset codes for the TxClkxx signals that are provided to the data bit transmitters 80 are determined, the controller 100 then determines the final codes for adjusting the TxClkxx signals. In this regard, the module 60 or possibly another component (in other embodiments of the invention) stores the offset codes for the TxClkxx signals. The code that is used to adjust the phase of each TxClkxx signal is the sum of the baseline code and the offset code. It is noted that the baseline code may continually change due to such factors as temperature and voltage drift. Therefore, to generate the TxClkxx signal for each data bit transmitter 80, the locked loop circuit 110 continually determines the baseline code (block 212) and adds to it the associated offset code to generate the final code, pursuant to block 214. For the example that is set forth herein, the baseline code may change from 40 hex (the original value) to 43 hex due to temperature and/or voltage drift. For this scenario, the code to adjust the TxClkxx signal for data bit zero is the summation of 43 hex and 3 hex, or 46 hex.

Many different embodiments are within the scope of the appended claims. For example, in accordance with some embodiments of the invention, the circuitry and techniques that are described herein may be applied to a high speed data interface other than a memory bus interface.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
providing an interface comprising transmitters to be coupled to a bus, each transmitter to transmit data to an associated data bit line of the bus and each transmitter being clocked by an associated transmit clock signal;

initializing a base clock signal and the transmit clock signals to have the same phase;

determining a baseline phase offset to apply the base clock signal to synchronize the base clock signal to a source clock signal of a source that supplies data to the transmitters;

for each transmitter, determining an associated phase offset to compensate for an associated skew; and controlling the phase of each transmit clock signal based on the associated phase offset and the baseline offset.

2. The method of claim 1, further comprising:
regulating the baseline phase offset to compensate for temperature drift.

3. The method of claim 1, further comprising:
regulating the baseline phase offset to compensate for voltage drift.

4. The method of claim 1, further comprising:
providing the base clock signal to the bus.

5. An apparatus, comprising:
a bus interface to be coupled to a bus, the bus interface comprising transmitters, each transmitter to transmit data to an associated data bit line of the bus, and each transmitter being clocked by an associated transmit clock signal;

initializing a base clock signal and the transmit clock signals to have the same phase; and a circuit to:

determine a baseline phase offset to apply the base clock signal to synchronize the base clock signal to a source clock signal of a source that supplies data to the transmitters;

for each transmitter, determine an associated phase offset to compensate for an associated skew; and control the phase of each transmit clock signal based on the associated phase offset and the baseline offset.

6. The apparatus of claim 5, wherein the apparatus comprises a memory interface of a memory controller hub.

7. The apparatus of claim 5, wherein the circuit regulates the baseline phase offset to compensate for temperature drift.

8. The apparatus of claim 5, wherein the circuit regulates the baseline phase offset to compensate for voltage drift.

9. The apparatus of claim 5, wherein each transmitter comprises a FIFO.

10. The apparatus of claim 5, further comprising:
a clock transmitter to provide the base clock signal to the bus.

* * * * *